US009630386B1

(12) United States Patent
Hsieh et al.

(10) Patent No.: US 9,630,386 B1
(45) Date of Patent: Apr. 25, 2017

(54) AUTOMATIC GLUING MECHANISM AND AUTOMATIC GLUING MACHINE USING THE SAME

(71) Applicant: Foxlink Image Technology Co., Ltd., New Taipei (TW)

(72) Inventors: Wei Pin Hsieh, New Taipei (TW); Yung Kai Chen, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 14/885,413

(22) Filed: Oct. 16, 2015

(51) Int. Cl.

| | |
|---|---|
| ***B29C 65/52*** | (2006.01) |
| ***B32B 37/12*** | (2006.01) |
| ***B32B 39/00*** | (2006.01) |
| ***B32B 43/00*** | (2006.01) |
| ***B32B 37/00*** | (2006.01) |

(52) U.S. Cl.
CPC .......... *B32B 37/12* (2013.01); *B32B 37/0053* (2013.01)

(58) Field of Classification Search
USPC ........................................ 156/538, 547, 578
See application file for complete search history.

(56) References Cited

U.S. PATENT DOCUMENTS 3,983,808 A * 10/1976 Jackson ................ B41F 27/005 101/401.3
4,122,983 A * 10/1978 Jolly .................. A46B 15/0071 222/390
4,461,404 A * 7/1984 Baughman .......... B05B 15/0208 118/302
4,564,410 A * 1/1986 Clitheros .............. B05C 5/0216 118/323
4,863,300 A * 9/1989 Arona-Delonghi .... A45D 40/04 401/116
5,409,977 A * 4/1995 Sitaramiah ............. C08K 5/098 427/207.1

(Continued)

FOREIGN PATENT DOCUMENTS

DE 3607986 C * 5/1987 ............... B43K 8/00
DE WO 9208388 A1 * 5/1992 ............. A45D 40/04

(Continued)

OTHER PUBLICATIONS

Enlish Abstract of DE 3607986 (Nov. 19, 2016).*

*Primary Examiner* — Sing P Chan
(74) *Attorney, Agent, or Firm* — WPAT, P.C., Intellectual Property Attorneys; Anthony King

(57) ABSTRACT

An automatic gluing machine includes an automatic gluing mechanism. The automatic gluing mechanism includes a sleeve, a pushing component mounted to the sleeve, an assembling head, and a driving module including a gear module. The sleeve is equipped with a first sleeve gear. The pushing component includes a rotating body and a first rotary gear. The assembling head is assembled inside the sleeve. The gear module cooperates the first rotary gear to drive the rotating body to rotate bidirectionally. The gear module cooperates with the first sleeve gear to make the sleeve to rotate in a single direction. A rotation speed difference between the first rotary gear and the first sleeve gear is generated, so after every rotation of the assembling head, a single-direction rotation displacement of the assembling head is generated relative to a last rotation of the assembling head.

10 Claims, 8 Drawing Sheets

(56) References Cited

U.S. PATENT DOCUMENTS 5,567,071 A * 10/1996 Lepsius .................. A45D 40/16 401/175
5,597,253 A * 1/1997 Lepsius .................. A45D 40/04 401/68
5,605,572 A * 2/1997 Berger ................... B43M 5/025 118/241
5,857,793 A * 1/1999 Bossert .................. A45D 40/16 401/134
5,997,201 A * 12/1999 Bossert .................. A45D 40/02 222/326
6,082,917 A * 7/2000 Noguchi ................ A45D 40/04 401/68
6,089,774 A * 7/2000 Franken ................. A45D 40/16 401/175
6,102,600 A * 8/2000 Bedol ................... B42F 13/406 401/75
6,374,736 B1 * 4/2002 Cresgy .................. B41F 35/005 101/423
6,676,319 B2 * 1/2004 Werhahn ................ A45D 40/04 401/68
6,817,799 B1 * 11/2004 Petit ....................... A45D 40/04 401/172
6,820,776 B2 * 11/2004 Hemming .......... B65D 83/0011 222/386
6,939,070 B2 * 9/2005 Butz .................. B65D 83/0011 401/175
6,979,379 B2 * 12/2005 White, II ................ B65B 51/02 156/152
7,270,710 B2 * 9/2007 Yamaguchi ............ B43M 11/06 118/241
D575,344 S * 8/2008 Kobayashi ..................... D19/66
D575,345 S * 8/2008 Kobayashi ..................... D19/66
7,692,123 B2 * 4/2010 Baba .................... A24B 15/165 131/365
7,806,614 B2 * 10/2010 Desson .................. A45D 40/02 401/179
8,851,339 B2 * 10/2014 Schultz .............. B65D 83/0005 222/327
8,875,955 B2 * 11/2014 Arora ..................... A45D 40/04 222/386
9,339,984 B2 * 5/2016 Pettersson ................. B31B 1/62
2001/0014247 A1 * 8/2001 Shochat ................. A45D 40/06 401/87
2002/0159819 A1 * 10/2002 Werhahn ................ A45D 40/04 401/88
2003/0075564 A1 * 4/2003 Wahlig ............... A61B 17/8827 222/206
2004/0194894 A1 * 10/2004 Takagi ...................... B42C 1/12 156/546
2006/0134328 A1 * 6/2006 Jia ......................... B42C 9/0006 427/207.1
2007/0193593 A1 * 8/2007 Baba .................... A24B 15/165 131/194
2008/0175995 A1 * 7/2008 Boyd .................... B05B 7/2483 427/287
2009/0095730 A1 * 4/2009 Ganzer ................. B29B 13/022 219/421
2010/0320234 A1 * 12/2010 Punchenko ......... B05C 17/0103 222/196
2012/0028776 A1 * 2/2012 Pettersson ................. B31B 1/62 493/128
2012/0129670 A1 * 5/2012 Pettersson ................. B31B 1/62 493/130
2012/0241094 A1 * 9/2012 Huang .................. B05C 5/0212 156/378
2014/0270887 A1 * 9/2014 Heipp ................. B05C 17/0133 401/6
2016/0038655 A1 * 2/2016 Weisman ............ B29C 67/0085 264/0.5
2016/0229145 A1 * 8/2016 Pettersson ................. B31B 1/62

FOREIGN PATENT DOCUMENTS

DE WO 9402046 A1 * 2/1994 ............. A45D 40/04
GB 1427931 A * 3/1976 ............. A45D 40/04
KR WO 2006088268 A1 * 8/2006 ............. A45D 40/04
NL WO 9622037 A1 * 7/1996 ............. A45D 40/04

* cited by examiner

AUTOMATIC GLUING MECHANISM AND AUTOMATIC GLUING MACHINE USING THE SAME

BACKGROUND OF THE INVENTION

1. Field of the Invention

The present invention generally relates to a gluing mechanism and a gluing machine using the same, and more particularly to an automatic gluing mechanism and an automatic gluing machine using the same.

2. The Related Art

Currently, an automatic gluing machine includes a mechanical body, a sensor and a gluing mechanism. The gluing mechanism includes an assembling head, a glue stick, a threaded rod, a plurality of gears and a motor. The motor rotates clockwise and anticlockwise to control the gears to rotate. The assembling head is fastened to a bottom end of the threaded rod. The glue stick is assembled to the assembling head with a bottom end of the glue stick projecting beyond a bottom end of the assembling head.

However, the threaded rod rotates to make the assembling head together with the glue stick to be just axially pushed out to coat a substrate with the glue stick. After every coating, the assembling head together with the glue stick is automatically retracted, and every coating action is proceeded in the same direction. As a result, the substrate is coated with the glue stick unevenly and an excessive glue is generated.

SUMMARY OF THE INVENTION

An object of the present invention is to provide an automatic gluing mechanism and an automatic gluing machine using the same. The automatic gluing mechanism includes a sleeve, a pushing component, an assembling head and a driving module. An outer periphery of the sleeve is equipped with a first sleeve gear. The pushing component is mounted to the sleeve. The pushing component includes a threaded rod assembled inside the sleeve, a rotating body connected with a top end of the threaded rod and projecting beyond a top end of the sleeve, and a first rotary gear mounted to a top end of the rotating body. The assembling head is assembled inside the sleeve and is fastened to a bottom end of the threaded rod by virtue of outer threads of the bottom end of the threaded rod. The assembling head and the sleeve are limited to be in a non-relative rotation status. The driving module includes a gear module, and a gear motor driving the gear module. The gear module cooperates the first rotary gear to drive the rotating body together with the threaded rod to rotate bidirectionally, so that the threaded rod rotates clockwise or anticlockwise to drive the assembling head to axially move along the sleeve. The gear module cooperates with the first sleeve gear to make the sleeve to rotate in a single direction so as to drive the assembling head to rotate in the single direction. A rotation speed difference between the first rotary gear and the first sleeve gear driven by the gear module is generated, so the assembling head together with a glue stick is axially pushed out of the sleeve or is retracted into the sleeve, the assembling head rotates in the single direction when the assembling head moves along the sleeve, after every rotation of the assembling head, a single-direction rotation displacement of the assembling head is generated relative to a last rotation of the assembling head.

The automatic gluing machine includes a mechanical body, a loader, a guiding rail, and the automatic gluing mechanism mounted to the loader. The guiding rail is mounted to the mechanical body. The loader is driven by a bearing motor to slide along the guiding rail. An initial end and a tail end of the guiding rail are respectively equipped with an initial sensor and a calibrating sensor. The initial sensor senses whether the loader is located at an original position. The calibrating sensor senses whether the loader is located at a distal position. The automatic gluing mechanism includes the sleeve, the pushing component, the assembling head and the driving module. The outer periphery of the sleeve is equipped with the first sleeve gear. The pushing component is mounted to the sleeve. The pushing component includes the threaded rod assembled inside the sleeve, the rotating body connected with the top end of the threaded rod and projecting beyond the top end of the sleeve, and the first rotary gear mounted to the top end of the rotating body. The assembling head is assembled inside the sleeve and is fastened to the bottom end of the threaded rod by virtue of the outer threads of the bottom end of the threaded rod. The assembling head and the sleeve are limited to be in the non-relative rotation status. The driving module includes the gear module, and the gear motor driving the gear module. The gear module cooperates the first rotary gear to drive the rotating body together with the threaded rod to rotate bidirectionally, so that the threaded rod rotates clockwise or anticlockwise to drive the assembling head to axially move along the sleeve. The gear module cooperates with the first sleeve gear to make the sleeve to rotate in the single direction so as to drive the assembling head to rotate in the single direction. The rotation speed difference between the first rotary gear and the first sleeve gear driven by the gear module is generated, so the assembling head together with the glue stick is axially pushed out of the sleeve or is retracted into the sleeve, the assembling head rotates in the single direction when the assembling head moves along the sleeve, after every rotation of the assembling head, the single-direction rotation displacement of the assembling head is generated relative to the last rotation of the assembling head.

As described above, the gear module cooperates the first rotary gear to drive the rotating body together with the threaded rod to rotate bidirectionally, so that the threaded rod rotates clockwise or anticlockwise to drive the assembling head to axially move along the sleeve, the gear module cooperates with the first sleeve gear to make the sleeve to rotate in the single direction so as to drive the assembling head to rotate in the single direction, and the rotation speed difference between the first rotary gear and the first sleeve gear driven by the gear module is generated, so the assembling head together with the glue stick is axially pushed out of the sleeve to coat the substrate with the glue stick or be retracted into the sleeve, and after every rotation of the assembling head, the single-direction rotation displacement of the assembling head is generated relative to the last rotation of the assembling head. As a result, a purpose of coating the substrate with the glue stick evenly and being without excessive glue is achieved.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
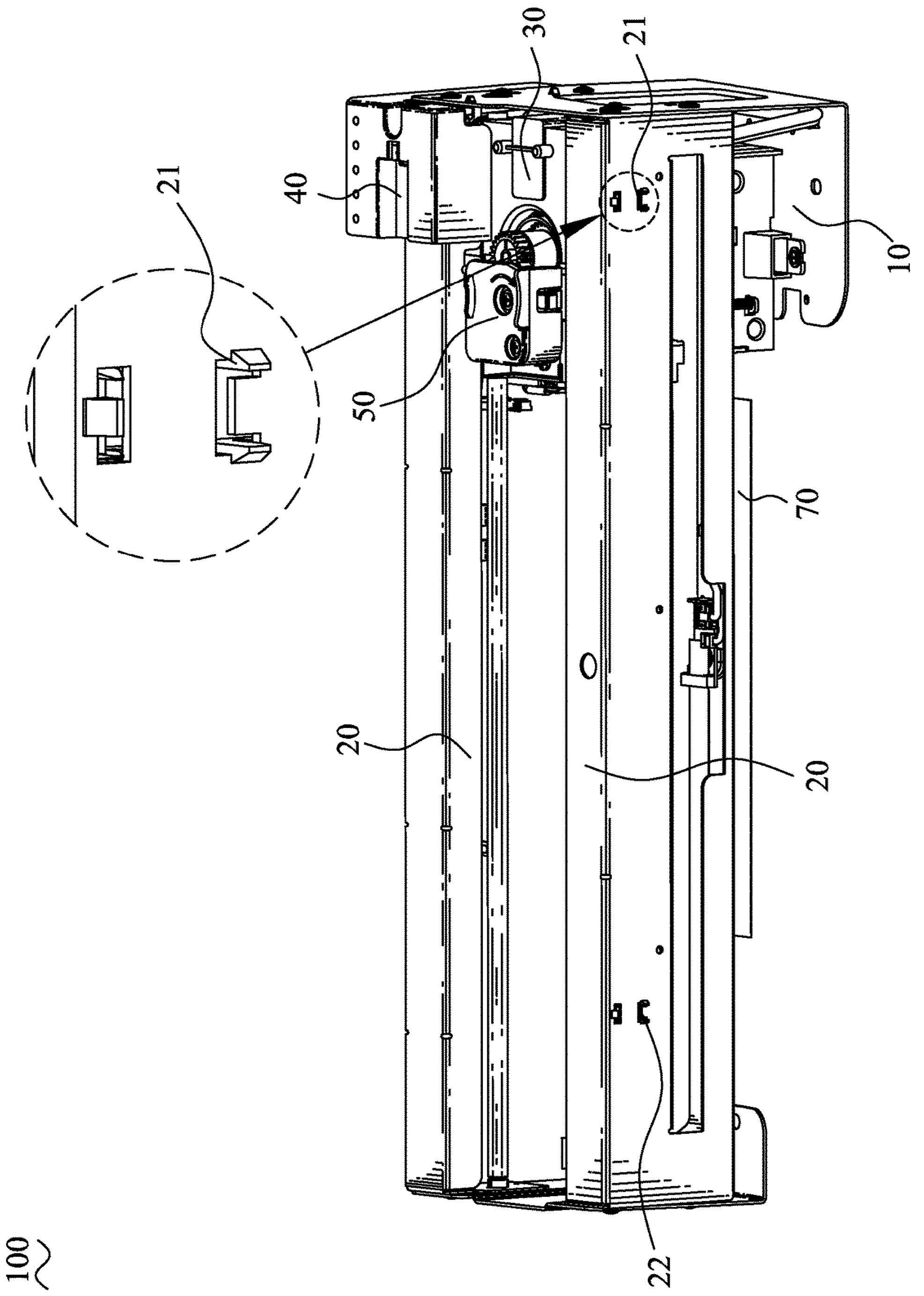
FIG. 1 is a perspective view of an automatic gluing mechanism in accordance with the present invention being located at an original position.
Figure 2:
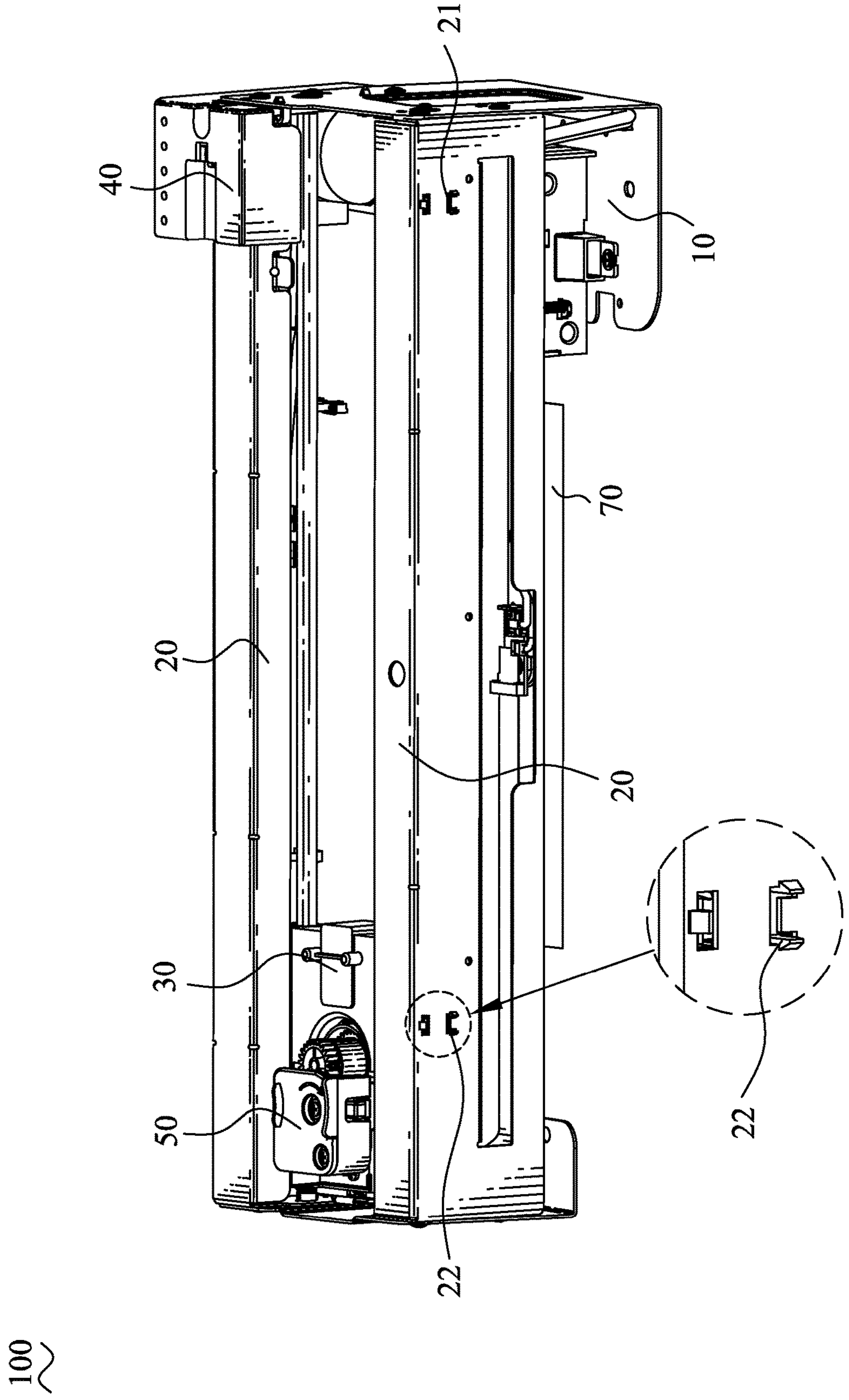
FIG. 2 is a perspective view of the automatic gluing mechanism in accordance with the present invention being located at a far end.

With reference to FIG. 1 and FIG. 2, an automatic gluing mechanism 50 and an automatic gluing machine 100 in accordance with the present invention are shown. The automatic gluing machine 100 in accordance with the present invention includes a mechanical body 10, a guiding rail 20, a loader 30, a bearing motor 40 and the automatic gluing mechanism 50.

With reference to FIG. 1 and FIG. 2, the guiding rail 20 is mounted to the mechanical body 10. The loader 30 is driven by the bearing motor 40 to slide along the guiding rail 20. An initial end and a tail end of the guiding rail 20 are respectively equipped with an initial sensor 21 and a calibrating sensor 22. The initial sensor 21 senses whether the loader 30 is located at an original position. The calibrating sensor 22 senses whether the loader 30 is located at a distal position.

With reference to FIG. 1 to FIG. 8, the automatic gluing mechanism 50 is mounted to the loader 30. The automatic gluing mechanism 50 includes an outer shell 51, a sleeve 52, a pushing component 53, an assembling head 54 and a driving module 55.

With reference to FIG. 1 to FIG. 4, the outer shell 51 is mounted outside the sleeve 52, the pushing component 53, the assembling head 54 and the driving module 55. The automatic gluing mechanism 50 is mounted to the loader 30 by the outer shell 51.

With reference to FIG. 5 to FIG. 8, a top end of an outer periphery of the sleeve 52 is equipped with a first sleeve gear 521. Several portions of an inner periphery of the sleeve 52 protrude inward to form a plurality of ribs 522.

With reference to FIG. 5 to FIG. 8, the pushing component 53 is mounted to the sleeve 52. The pushing component 53 includes a threaded rod 531 assembled inside the sleeve 52, a rotating body 532 connected with a top end of the threaded rod 531 and projecting beyond a top end of the sleeve 52, and a first rotary gear 533 mounted to a top end of the rotating body 532.

Figure 7:
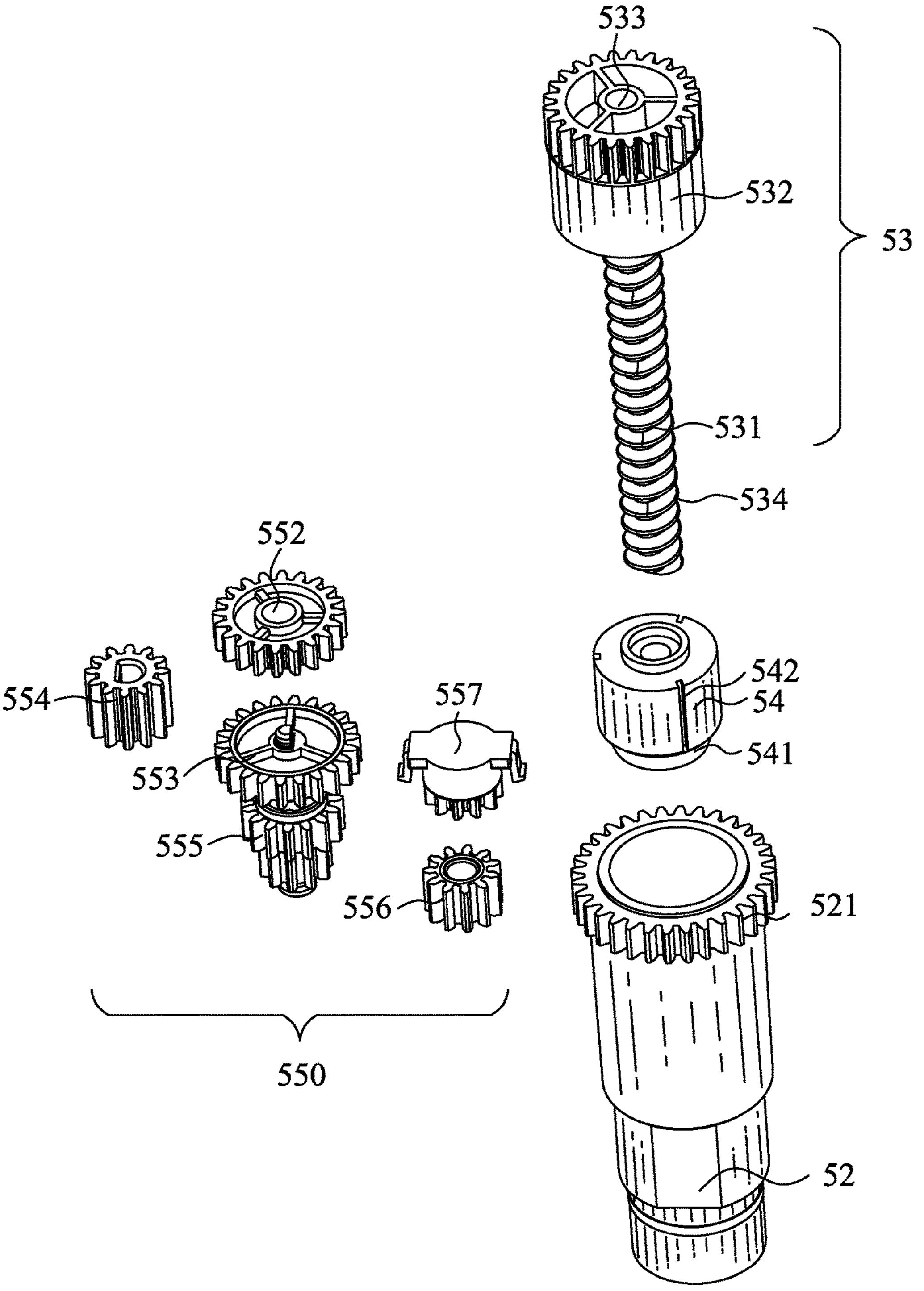
FIG. 7 is an exploded view of the automatic gluing mechanism of FIG. 6.
Figure 8:
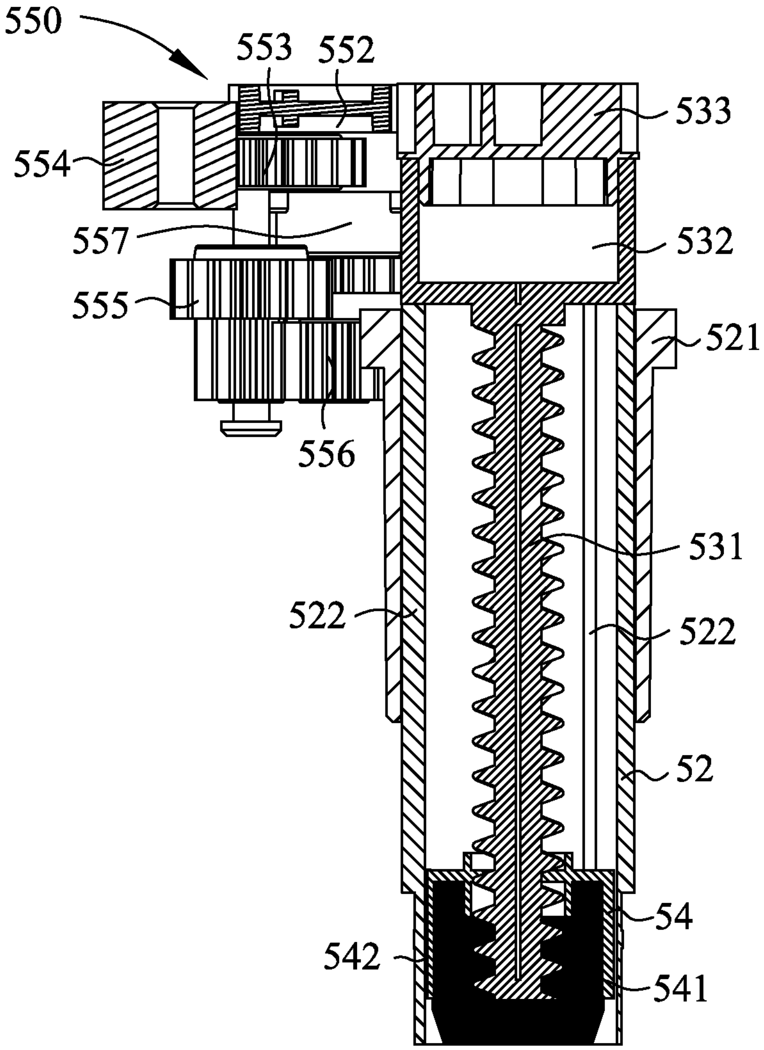
FIG. 8 is a sectional view of the automatic gluing mechanism along a line VIII-VIII of FIG. 6.

With reference to FIG. 7 and FIG. 8, the assembling head 54 is assembled inside the sleeve 52 and is fastened to a bottom end of the threaded rod 531 by virtue of outer threads 534 of the bottom end of the threaded rod 531. The automatic gluing mechanism 50 further includes a glue stick 541. The glue stick 541 is assembled to the assembling head 54 with a bottom end of the glue stick 541 projecting beyond a bottom end of the assembling head 54. Several portions of an outer periphery of the assembling head 54 are recessed inward to form a plurality of narrow slots 542 penetrating through a top surface and a bottom surface of the assembling head 54. The narrow slots 542 are corresponding to the ribs 522. The ribs 522 are slidably disposed in the narrow slots 542. When the threaded rod 531 cooperates the assembling head 54 to rotate, the ribs 522 are limited in the narrow slots 542 to make the assembling head 54 axially move along the sleeve 52. The assembling head 54 and the sleeve 52 are limited to be in a non-relative rotation status.

With reference to FIG. 3 to FIG. 7, the driving module 55 includes a gear module 550, and a gear motor 551 driving the gear module 550. The gear module 550 cooperates the first rotary gear 533 to drive the rotating body 532 together with the threaded rod 531 to rotate bidirectionally, so that the threaded rod 531 rotates clockwise or anticlockwise to drive the assembling head 54 to axially move along the sleeve 52. The gear module 550 cooperates with the first sleeve gear 521 to make the sleeve 52 to rotate in a single direction so as to drive the assembling head 54 to rotate in the single direction. A rotation speed difference between the first rotary gear 533 and the first sleeve gear 521 driven by the gear module 550 is generated, so the assembling head 54 together with the glue stick 541 is axially pushed out of the sleeve 52 to coat the substrate 70 with the glue stick 541 or be retracted into the sleeve 52. The assembling head 54 rotates in the single direction when the assembling head 54 moves along the sleeve 52. So that after every rotation of the assembling head 54, a single-direction rotation displacement of the assembling head 54 is generated relative to a last rotation of the assembling head 54.

With reference to FIG. 3 to FIG. 7, the gear module 550 includes a second rotary gear 552 driving the first rotary gear 533, and a second sleeve gear 553 driving the first sleeve gear 521, a driving gear 554, a single-direction gear 555 and a transmission gear 556. The second rotary gear 552 and the second sleeve gear 553 are respectively engaged with the driving gear 554. The driving gear 554 is driven by the gear motor 551. Specifically, the second rotary gear 552 is engaged with the first rotary gear 533. The single-direction gear 555 is disposed under the second sleeve gear 553. The second sleeve gear 553 and the single-direction gear 555 rotate coaxially. The single-direction gear 555 is engaged with the transmission gear 556. The transmission gear 556 is engaged with the first sleeve gear 521. A transmission direction of the single-direction gear 555 is an anticlockwise direction.

Figure 5:
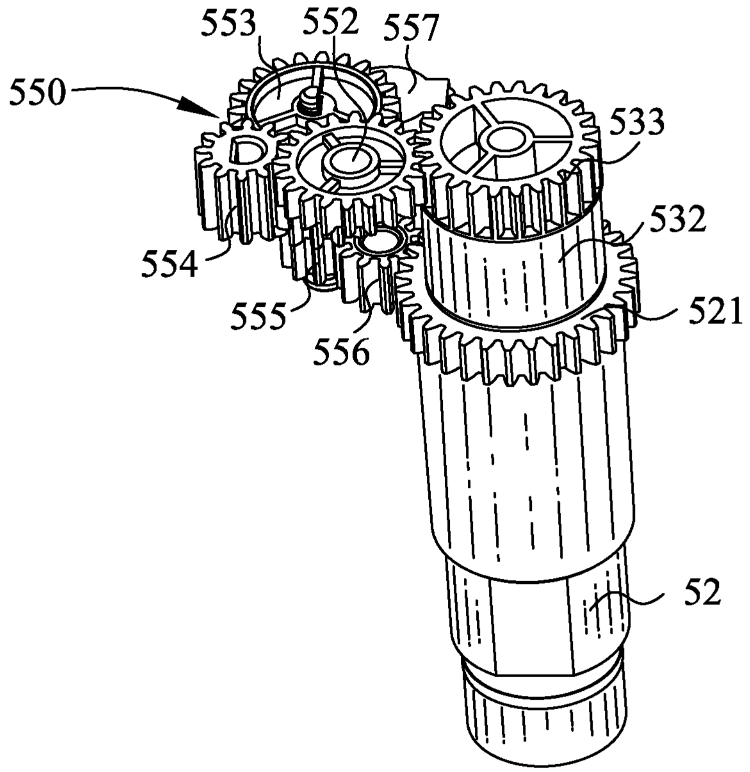
FIG. 5 is a perspective view of the automatic gluing mechanism in accordance with the present invention being without an outer shell and a geared motor.
Figure 6:
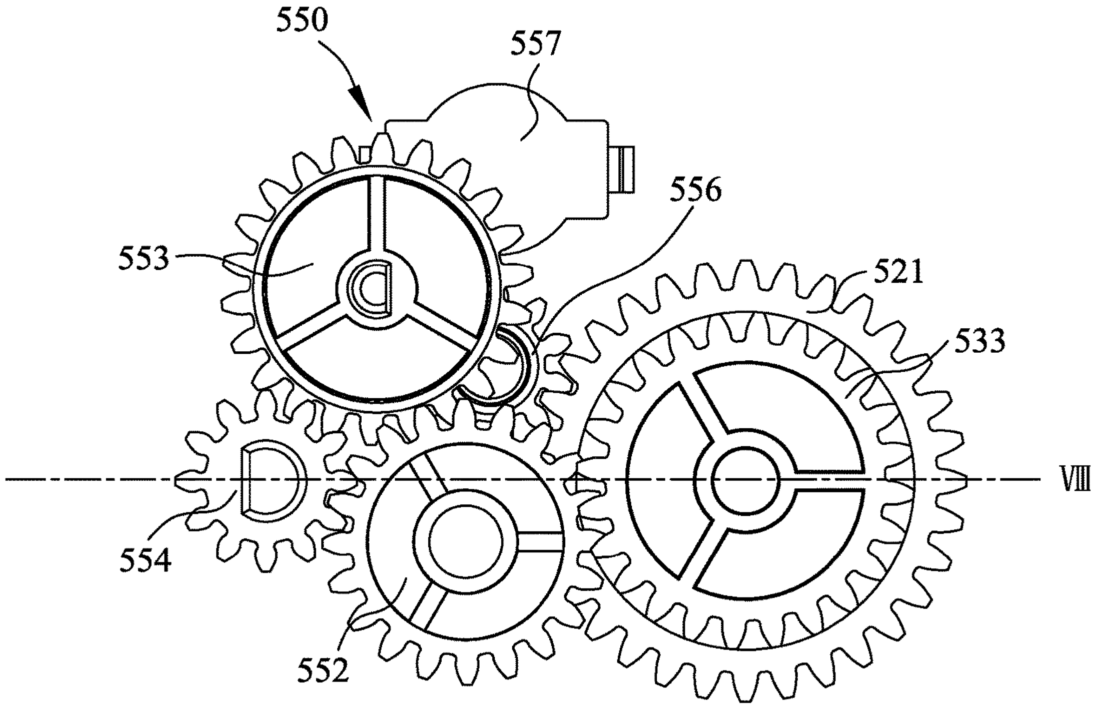
FIG. 6 is a vertical view of the automatic gluing mechanism of FIG. 5.

With reference to FIG. 5 to FIG. 7, the gear module 550 further includes a brake 557. The brake 557 cooperates with the single-direction gear 555 to ensure that the single-direction gear 555 keeps an idling status when the single-direction gear 555 rotates in a non-transmission direction. The non-transmission direction of the single-direction gear 555 is a clockwise direction. Specifically, when the second sleeve gear 553 rotates anticlockwise, the single-direction gear 555 rotates anticlockwise and is engaged with the brake 557. When the second sleeve gear 553 rotates clockwise, the single-direction gear 555 is limited by the brake 557 to ensure the single-direction gear 555 to keep the idling status.

Figure 3:
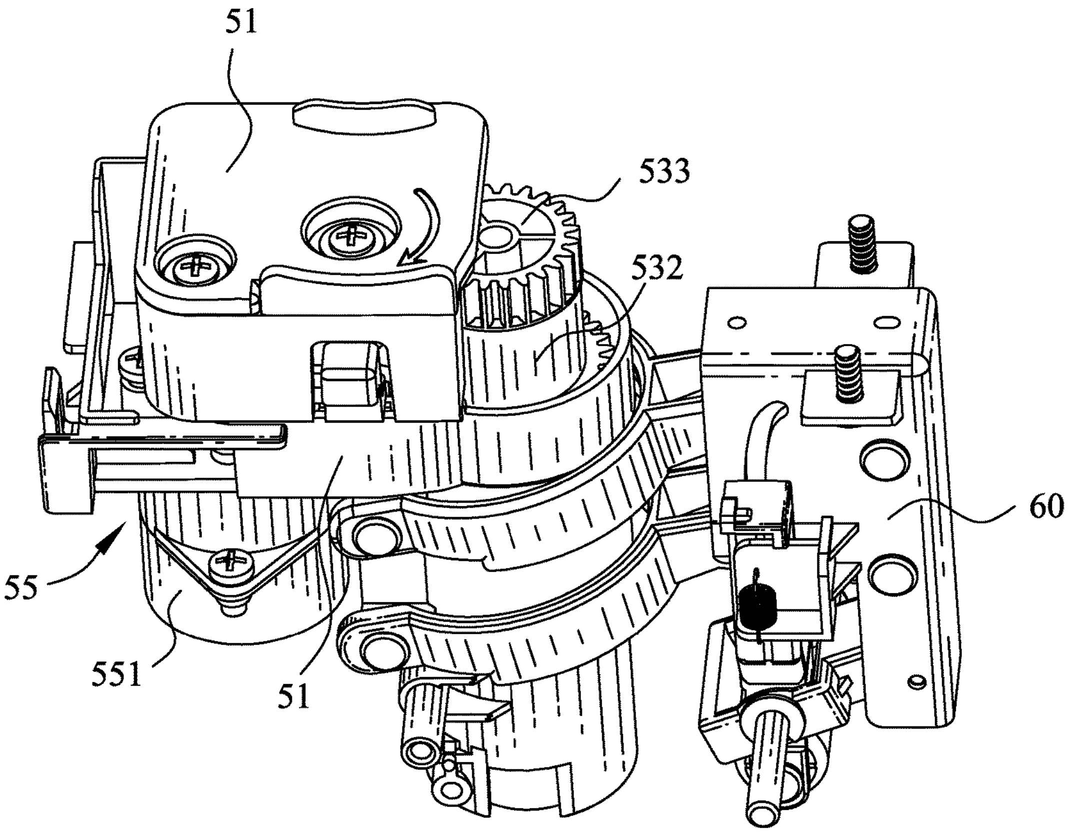
FIG. 3 is a perspective view of an automatic gluing mechanism and a guiding roller of the automatic gluing machine in accordance with the present invention.
Figure 4:
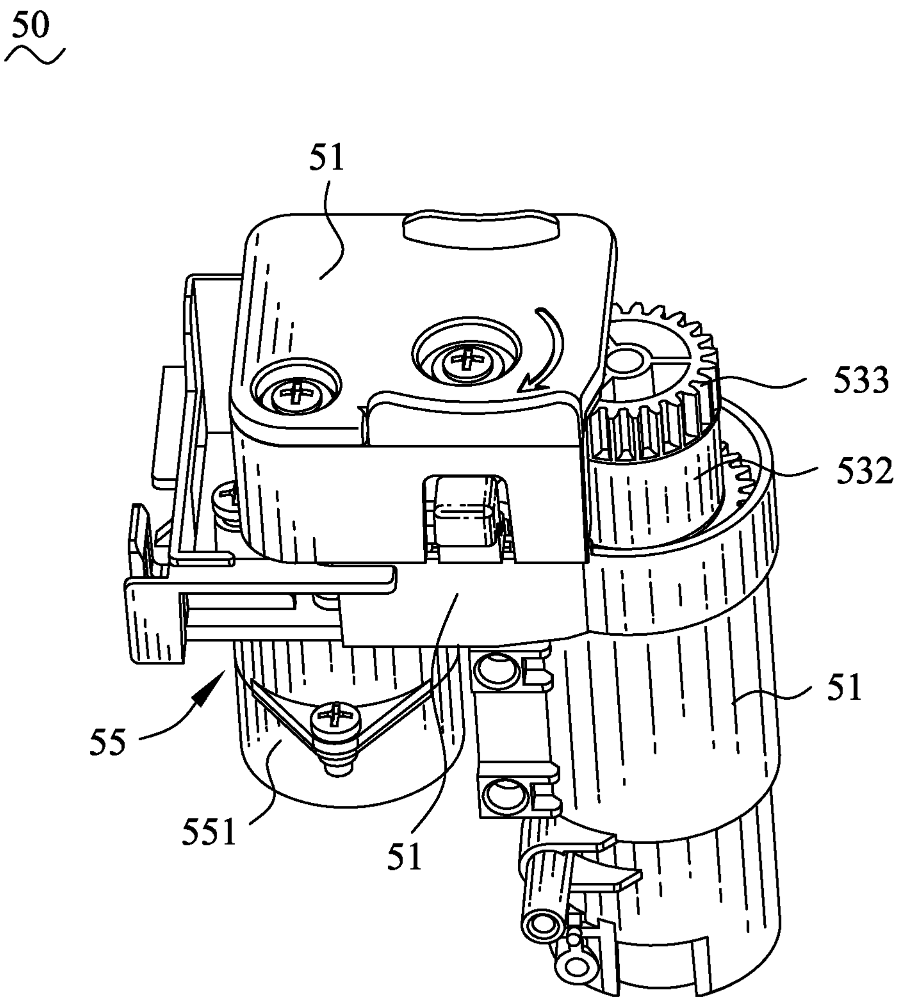
FIG. 4 is a perspective view of the automatic gluing mechanism of the automatic gluing machine of FIG. 1.

With reference to FIG. 2 and FIG. 3, the automatic gluing machine 100 further includes a steering device 60. The loader 30 is equipped with the steering device 60. The steering device 60 is connected with the outer shell 51 of the automatic gluing mechanism 50 for guiding the automatic gluing mechanism 50 to coat a substrate 70 with the glue stick 541.

With reference to FIG. 1 and FIG. 2, the automatic gluing machine 100 further includes a control system (not shown).

The control system controls the bearing motor 40 to drive the loader 30 to slide between the initial sensor 21 and the calibrating sensor 22 by sensing signals of the initial sensor 21 and the calibrating sensor 22. And simultaneously, the control system controls the gear motor 551 to drive the gear module 550 to work.

With reference to FIG. 1, when the automatic gluing machine 100 stops working, the loader 30 is located at an original position, when the gear motor 551 stops working, the assembling head 54 of the automatic gluing mechanism 50 is accommodated in the sleeve 52.

With reference to FIG. 1 to FIG. 8, when the automatic gluing machine 100 is in work, a specific operation principle is described as follows.

The bearing motor 40 brings along the loader 30 to slide along the guiding rail 20 to the distal position. The calibrating sensor 22 senses the loader 30 to generate a first sensing signal and sends the first sensing signal to the control system. The control system controls the gear motor 551 to drive the driving gear 554 to rotate clockwise, the driving gear 554 drives the second rotary gear 552 and the second sleeve gear 553 to rotate anticlockwise. The second rotary gear 552 is engaged with the first rotary gear 533, so the second rotary gear 552 drives the first rotary gear 533 to rotate clockwise so as to drive the rotating body 532 and the threaded rod 531 to rotate clockwise. The second sleeve gear 553 together with the single-direction gear 555 coaxially rotates anticlockwise. The single-direction gear 555 is engaged with the transmission gear 556, so the single-direction gear 555 drives the transmission gear 556 to rotate clockwise. The transmission gear 556 is engaged with the first sleeve gear 521, so the transmission gear 556 drives the first sleeve gear 521 together with the sleeve 52 to rotate anticlockwise. At the moment, the ribs 522 are slidably disposed in the narrow slots 542, the threaded rod 531 cooperates with the assembling head 54, and the rotation speed difference between the first rotary gear 533 and the first sleeve gear 521 driven by the gear module 550 is generated, so the assembling head 54 together with the glue stick 541 is axially pushed out of the sleeve 52 and rotates anticlockwise.

After the assembling head 54 is pushed out of the sleeve 52, the bearing motor 40 drives the loader 30 to slide towards the original position along the guiding rail 20. The steering device 60 guides the automatic gluing mechanism 50 to coat the substrate 70 with the glue stick 541.

After completing coating the substrate 70 with the glue stick 541, the loader 30 returns to the original position, the initial sensor 21 senses the loader 30 to generate a second sensing signal and sends the second sensing signal to the control system, the control system controls the gear motor 551 to drive the driving gear 554 to rotate anticlockwise, the driving gear 554 drives the second rotary gear 552 and the second sleeve gear 553 to rotate clockwise. The second rotary gear 552 is engaged with the first rotary gear 533, so the second rotary gear 552 drives the first rotary gear 533 to rotate anticlockwise so as to drive the rotating body 532 and the threaded rod 531 to rotate anticlockwise. The single-direction gear 555 keeps the idling status under a braking action of the brake 557, so that the driving gear 556 has no way of rotating to make the first sleeve gear 521 keep a static status. At the moment, the ribs 522 are slidably disposed in the narrow slots 542, the threaded rod 531 cooperates with the assembling head 54, so that the assembling head 54 is axially retracted into the sleeve 52.

When the assembling head 54 is pushed out of the sleeve 52, the assembling head 54 is without being limited to move axially and rotate in the single direction, the assembling head 54 is capable of just moving axially. Correspondingly, when the assembling head 54 is retracted into the sleeve 52, the assembling head 54 is without being limited to just move axially, the assembling head 54 is capable of moving axially and rotating in the single direction.

As described above, the gear module 550 cooperates the first rotary gear 533 to drive the rotating body 532 together with the threaded rod 531 to rotate bidirectionally, so that the threaded rod 531 rotates clockwise or anticlockwise to drive the assembling head 54 to axially move along the sleeve 52, the gear module 550 cooperates with the first sleeve gear 521 to make the sleeve 52 to rotate in the single direction so as to drive the assembling head 54 to rotate in the single direction, and the rotation speed difference between the first rotary gear 533 and the first sleeve gear 521 driven by the gear module 550 is generated, so the assembling head 54 together with the glue stick 541 is axially pushed out of the sleeve 52 to coat the substrate 70 with the glue stick 541 or be retracted into the sleeve 52, and after every rotation of the assembling head 54, the single-direction rotation displacement of the assembling head 54 is generated relative to the last rotation of the assembling head 54. As a result, a purpose of coating the substrate 70 with the glue stick 541 evenly and being without excessive glue is achieved.

What is claimed is:

1. An automatic gluing mechanism, comprising:

a sleeve comprising a first sleeve gear attached to an outer periphery of the sleeve;

a pushing component mounted to the sleeve comprising a threaded rod assembled with a rotating body connect to a top end portion of the threaded rod and projecting beyond a top end portion of the sleeve;

a first rotary gear mounted to a top end portion of the rotating body;

an assembling head mounted inside the sleeve and fastened to a bottom end of the threaded rod wherein the assembling head and the sleeve are limited in a non-relative rotation status;

a driving module comprising a gear motor for driving a gear module;

wherein the gear module cooperating with the first rotary gear to drive the rotating body together with the threaded rod to rotate clockwise or anticlockwise to drive and move the assembling head to axially along the sleeve;

the gear module further cooperating with the first sleeve gear to rotate the sleeve and the assembling head in the single direction;

wherein a rotation speed difference is provided by the gear module between the first rotary gear and the first sleeve gear to push or retract the assembling head together with a glue stick; and wherein every rotation of the assembling head moves the assembling head along the sleeve.

2. The automatic gluing mechanism as claimed in claim 1, wherein several portions of an inner periphery of the sleeve protrude inward to form a plurality of ribs, several portions of an outer periphery of the assembling head are recessed inward to form a plurality of narrow slots axially penetrating the assembling head, the ribs are slidably disposed in the narrow slots, wherein the threaded rod cooperating with the assembling head to rotate, the ribs are limited in the narrow slots to make the assembling head axially move along the sleeve.

3. The automatic gluing mechanism as claimed in claim 1, wherein the gear module includes a second rotary gear driving the first rotary gear, a second sleeve gear driving the first sleeve gear, a driving gear and a single-direction gear, the second rotary gear and the second sleeve gear are respectively engaged with the driving gear, the driving gear is driven by the gear motor, the second sleeve gear and the single-direction gear rotate coaxially.

4. The automatic gluing mechanism as claimed in claim 3, wherein the gear module further includes a transmission gear, wherein the second rotary gear is engaged with the first rotary gear, the single-direction gear is engaged with the transmission gear, the transmission gear is engaged with the first sleeve gear.

5. The automatic gluing mechanism as claimed in claim 3, wherein the gear module further includes a brake, wherein the brake cooperating with the single-direction gear to ensure that the single-direction gear keeps an idling status when the single-direction gear rotates in a non-transmission direction.

6. An automatic gluing machine, comprising:

a mechanical body;

a loader;

a guiding rail comprising an initial end and a tail end equipped with an initial sensor and a calibrating sensor mounted to the mechanical body, the loader driven by a bearing motor to slide along the guiding rail, the initial sensor sensing whether the loader is located at an original position, the calibrating sensor sensing whether the loader is located at a distal position; and an automatic gluing mechanism mounted to the loader, including:

a sleeve comprising a first sleeve gear attached to an outer periphery of the sleeve;

a pushing component mounted to the sleeve comprising a threaded rod assembled with a rotating body connect to a top end portion of the threaded rod and projecting beyond a top end portion of the sleeve;

a first rotary gear mounted to a top end portion of the rotating body;

an assembling head mounted inside the sleeve and fastened to a bottom end of the threaded rod wherein the assembling head and the sleeve are limited in a non-relative rotation status;

a driving module comprising a gear motor for driving a gear module;

wherein the gear module cooperating with the first rotary gear to drive the rotating body together with the threaded rod to rotate clockwise or anticlockwise to drive and move the assembling head to axially along the sleeve;

the gear module further cooperating with the first sleeve gear to rotate the sleeve and the assembling head in the single direction;

wherein a rotation speed difference is provided by the gear module between the first rotary gear and the first sleeve gear to push or retract the assembling head together with a glue stick; and wherein every rotation of the assembling head moves the assembling head along the sleeve.

7. The automatic gluing machine as claimed in claim 6, wherein several portions of an inner periphery of the sleeve protrude inward to form a plurality of ribs, several portions of an outer periphery of the assembling head are recessed inward to form a plurality of narrow slots axially penetrating the assembling head, the ribs are slidably disposed in the narrow slots, wherein the threaded rod cooperating with the assembling head to rotate, the ribs are limited in the narrow slots to make the assembling head axially move along the sleeve.

8. The automatic gluing machine as claimed in claim 6, wherein the gear module includes a second rotary gear driving the first rotary gear, a second sleeve gear driving the first sleeve gear, a driving gear and a single-direction gear, the second rotary gear and the second sleeve gear are respectively engaged with the driving gear, the driving gear is driven by the gear motor, the second sleeve gear and the single-direction gear rotate coaxially.

9. The automatic gluing machine as claimed in claim 8, wherein the gear module further includes a transmission gear, wherein the second rotary gear is engaged with the first rotary gear, the single-direction gear is engaged with the transmission gear, the transmission gear is engaged with the first sleeve gear.

10. The automatic gluing gluing machine as claimed in claim 8, wherein the gear module further includes a brake, wherein the brake cooperating with the single-direction gear to ensure that the single-direction gear keeps an idling status when the single-direction gear rotates in a non-transmission direction.

* * * * *